(12) United States Patent
Brown et al.

(10) Patent No.: US 6,606,447 B2
(45) Date of Patent: Aug. 12, 2003

(54) OPTICAL ATTENUATOR INCLUDING DUAL CONTROL LOOPS

(75) Inventors: Roger W Brown, Nottingham (GB); Earl A Dennis, Nottingham (GB)

(73) Assignee: Manconi Communications Limited, Coventry (GB)

( * ) Notice: Subject to any disclaimer, the term of this patent is extended or adjusted under 35 U.S.C. 154(b) by 152 days.

(21) Appl. No.: 09/815,382

(22) Filed: Mar. 22, 2001

(65) Prior Publication Data

US 2002/0136523 A1 Sep. 26, 2002

(51) Int. Cl.[7] .............................. G02B 6/00; G02F 1/17
(52) U.S. Cl. ............................. 385/140; 385/2; 385/8; 359/341.43
(58) Field of Search ......................... 385/140, 2, 5, 385/8; 359/341.43

(56) References Cited

U.S. PATENT DOCUMENTS 6,208,798 B1 * 3/2001 Morozov et al. ........... 385/140
6,370,312 B1 * 4/2002 Wagoner et al. ............ 385/140

2002/0031324 A1 * 3/2002 Cao et al. .................. 385/140
2002/0141726 A1 * 10/2002 Chaan et al. ............... 385/140

* cited by examiner

Primary Examiner—Robert H. Kim
Assistant Examiner—Krystyna Suchecki
(74) Attorney, Agent, or Firm—Kirschstein, et al.

(57) ABSTRACT

The present invention provides an optical attenuator comprising an optical attenuator module, an optical splitter, a detector and a control unit. Input radiation ($P_i$) is received at the attenuator module which is operable to attenuate the input radiation to generate corresponding attenuated radiation ($P_o$). The detector is operable to receive a portion of the attenuated radiation (0.1 $P_o$) and generate a corresponding electrical signal $T_1$. The signal $T_1$ is applied by the control unit via a first feedback loop to regulate the attenuator module so that radiation power of the attenuated radiation is maintained to a predetermined level. In a situation where an interruption of the input radiation ($P_i$) occurs, the control unit is operable to monitor temperature of the attenuator module using a thermistor sensor and to regulate the temperature of the module using a second feedback loop to a predetermined temperature during the interruption. On termination of the interruption, control of the attenuator module is transferred back to the first feedback loop to maintain the attenuated radiation to the predetermined level.

15 Claims, 3 Drawing Sheets

OPTICAL ATTENUATOR INCLUDING DUAL CONTROL LOOPS

FIELD OF THE INVENTION

The present invention relates to an optical attenuator including dual control loops, the attenuator being suitable for use in optical communication systems where control of optical power is required. Moreover, the invention also relates to a method of controlling the optical attenuator using two control loops.

BACKGROUND OF THE INVENTION

Conventional optical communication systems comprise a plurality of nodes interconnected by optical fibre waveguides for conveying communication traffic between the nodes. In such systems, it is current practice to employ wavelength division multiplexing (WDM) where the optical radiation propagating along the waveguides comprises radiation components distributed into a number of wavebands having mutually different frequencies, each component conveying an associated portion of the communication traffic. Optical amplification is included at various nodes in the systems to maintain radiation power level, thereby improving signal-to-noise ratio and extending communication range possible. Such optical amplification is conventionally provided by optically-pumped erbium-doped optical fibre amplifiers (EDFA). EDFAs are inherently non-linear devices; hence, it is important that input radiation provided thereto is within a reasonable operating range. Insufficient input radiation power can result in threshold effects in the devices causing amplified radiation output therefrom to suffer erratic fluctuations. Conversely, excess input radiation can result in saturation effects within the devices because of finite laser pumping power available in the devices. Characteristics of the devices for both insufficient input radiation power and excess input radiation power can result in errors being introduced into data conveyed in radiation amplified by the devices; such introduction of errors is a serious problem in communication systems where system clients demand a high degree of communication reliability.

For addressing the aforementioned problem, it is conventional practice to employ a line build out (LBO) attenuator prior to each EDFA to ensure that input radiation supplied to the EDFA is within a range over which the EDFA functions without introducing errors into the radiation propagating therethrough. Moreover, it is conventional practice to monitor radiation power provided from the attenuator to the EDFA and compare it with a reference level corresponding to optimum power input to the EDFA; attenuation provided by the attenuator is then adjusted by a negative feedback circuit to maintain the radiation power input to the EDFA at nominally the reference level.

Such an arrangement comprising an LBO attenuator connected prior to an associated EDFA operates satisfactorily in practice for a relatively static situation where fluctuations in input optical power to the attenuator occur gradually so that the attenuator and its associated feedback circuit are able to track the fluctuations. However, in conventional communication systems, abrupt interruptions in optical power supplied can occur, for example when the systems are being reconfigured to incorporate new add-drop multiplexers.

When such an interruption occurs, the feedback circuit associated with the attenuator will respond to the interruption by reducing attenuation provided by the attenuator because the interruption is analogous to substantially a zero level of input radiation power. There subsequently arises a transitory problem when optical power is reapplied to the attenuator after the interruption; the attenuator will be set to a low attenuation by the feedback circuit during the interruption so that the EDFA on reapplication of the radiation to the attenuator will be overloaded until the feedback circuit has an opportunity to react by increasing the attenuation provided by the attenuator to an acceptable level as before prior to the interruption. Such overload will result in corruption of data conveyed in the radiation whilst readjustment in the feedback circuit occurs. The attenuator and its associated circuit exhibit a time response which is many orders of magnitude greater than the duration of data pulses conveyed in the radiation; hence, data corruption will continue to occur until the feedback circuit has reacted.

A conventional solution for coping with such an interruption in the input radiation is to hold the feedback circuit so that the control signal provided to the attenuator for controlling its attenuation is held during the duration of the interruption at its value immediately prior to interruption. Although, to a first order, such holding of the control circuit can reduce overload from occurring in the EDFA, the attenuator itself can be prone to drift with regard to attenuation provided even if the control signal applied thereto is held constant. Such drift can occur due to changes in one or more environmental factors affecting the attenuator.

SUMMARY OF THE INVENTION

The inventors have appreciated that the circuit can be modified to include a second negative feedback circuit linked to temperature of the attenuator to hold the temperature of the attenuator substantially constant during the interruption, the attenuator providing a characteristic that radiation propagating therethrough is subject to an attenuation dependent upon temperature of the attenuator.

According to a first aspect of the present invention, there is provided an optical attenuator for a communication system, the attenuator including:

a) attenuating means for receiving optical input radiation and for optically attenuating the input radiation to generate corresponding optical output radiation; and b) controlling means for controlling attenuation provided by the attenuating means, characterized in that c) on application of the input radiation to the attenuating means, the controlling means is operable using a first feedback loop to monitor the output radiation and to regulate its power to a predetermined level by controlling a physical attenuation determining parameter of the attenuating means; and d) on interruption of the input radiation to the attenuating means, the controlling means is operable using a second feedback loop to monitor the physical parameter and to regulate the parameter to a predetermined level.

The invention provides the advantage that the attenuator is capable of maintaining the attenuating means attenuation at a level which will not result in overload when the input radiation is reapplied after an interruption thereof.

The attenuator preferably includes optical amplifying means for receiving and amplifying the output radiation from the attenuating means to generate amplified output radiation for output from the attenuator. Inclusion of the amplifying means enables the attenuator to selectively provide both amplification and attenuation for the input radiation transmitted through to the amplified output radiation. Advantageously, the amplifying means includes an erbium-doped optical fibre amplifier. Such an amplifier is prone to overload and to saturation, but the attenuating means and controlling means are operable to counteract overload in the amplifier. Conveniently, the controlling means is operable to regulate the physical parameter on interruption of the input radiation so that overload is avoided within the attenuator on subsequent reapplication of the input radiation.

The predetermined level during the interruption is preferably a value of the parameter immediately prior to the controlling means switching from controlling the attenuating means using the first loop to controlling the attenuating means using the second loop. Alternatively, the predetermined level can be a fixed set value which is not modified.

The attenuator in practice exhibits a finite response bandwidth. In order to avoid transient settling disturbances of the controlling means when switching between the first loop and the second loop, it is preferable that the controlling means is operable to switch from the second loop to the first loop a settling period after reapplication of the input radiation after an interruption.

In order for the attenuator to switch at an appropriate instance to the second loop, it is desirable that the controlling means includes detecting means for detecting occurrence of an interruption of the input radiation, said interruption being determinable from abrupt changes in the radiation power of the output radiation, and for prompting the controlling means to switch to using the second feedback loop to control the attenuating means.

In some circumstances, the communication system can issue a warning signal that interruption is imminent. It is therefore desirable that the controlling means includes detecting means for detecting occurrence of interruption of the input radiation, said detecting means operable to interpret warning data supplied to the detecting means indicative of an imminent input radiation interruption.

Advantageously, attenuation provided by the attenuating means is determined by the temperature of attenuation determining optical parts thereof. Thus, conveniently, the aforementioned physical parameter is a temperature of at least part of the attenuating means. In other words, the attenuating means is preferably operable to provide optical attenuation of the input radiation to generate the output radiation dependent upon the temperature of the attenuating means.

For practical convenience of both heating and cooling the attenuating means to control its attenuation, the attenuating means preferably includes a thermoelectric element controllable from the controlling means for heating or cooling the attenuating means, thereby controlling optical attenuation within the attenuating means.

For achieving enhanced power efficiency in the attenuator, the controlling means is preferably operable to drive the thermoelectric element with a pulse width modulated (PWM) electrical drive signal for controlling power input to the thermoelectric element and thereby controlling the temperature of the attenuating means. Switched PWM control provides the benefit that power loss in driver electronic circuits generating the PWM drive signal is less compared to equivalent circuits operable in a non-switching mode.

Conveniently, the attenuating means includes a thermistor sensor for sensing the temperature of the attenuating means and for providing a measure of the temperature of the attenuating means to the controlling means for use when the second loop is activated. The thermistor, when included within a potential divider, is capable of providing a useful magnitude of temperature indicative signal for the controlling means. In contrast, potentials developed by thermocouple sensors are often in the order of microvolts and require considerable amplification before acquiring a suitable magnitude suitable for the controlling means.

Conveniently, the controlling means comprises one or more microprocessors, and the first and second feedback loops are implemented in software executable on said one or more microprocessors. Software implementation of the feedback loops provides flexibility, especially when said one or more microprocessors are required to exchange data or communicate with other microprocessors present in the communication system.

According to a second aspect of the present invention, there is provided a method of controlling an optical attenuator for a communication system, the attenuator including:

a) attenuating means for receiving optical input radiation and for optically attenuating the input radiation to generate corresponding optical output radiation; and b) controlling means for controlling attenuation provided by the attenuating means, characterized in that the method includes the steps of:

c) on application of the input radiation to the attenuating means, monitoring the output radiation and using a first feedback loop of the controlling means to regulate power of the output radiation to a predetermined level by controlling a physical attenuation determining parameter of the attenuating means; and d) on interruption of the input radiation to the attenuating means, monitoring the physical parameter and using a second feedback loop of the controlling means to regulate the parameter to a predetermined level.

Embodiments of the invention will now be described, by way of example only, with reference to the following diagrams and the following detailed description of the preferred embodiments.

DETAILED DESCRIPTION OF THE PREFERRED EMBODIMENTS

Figure 1:
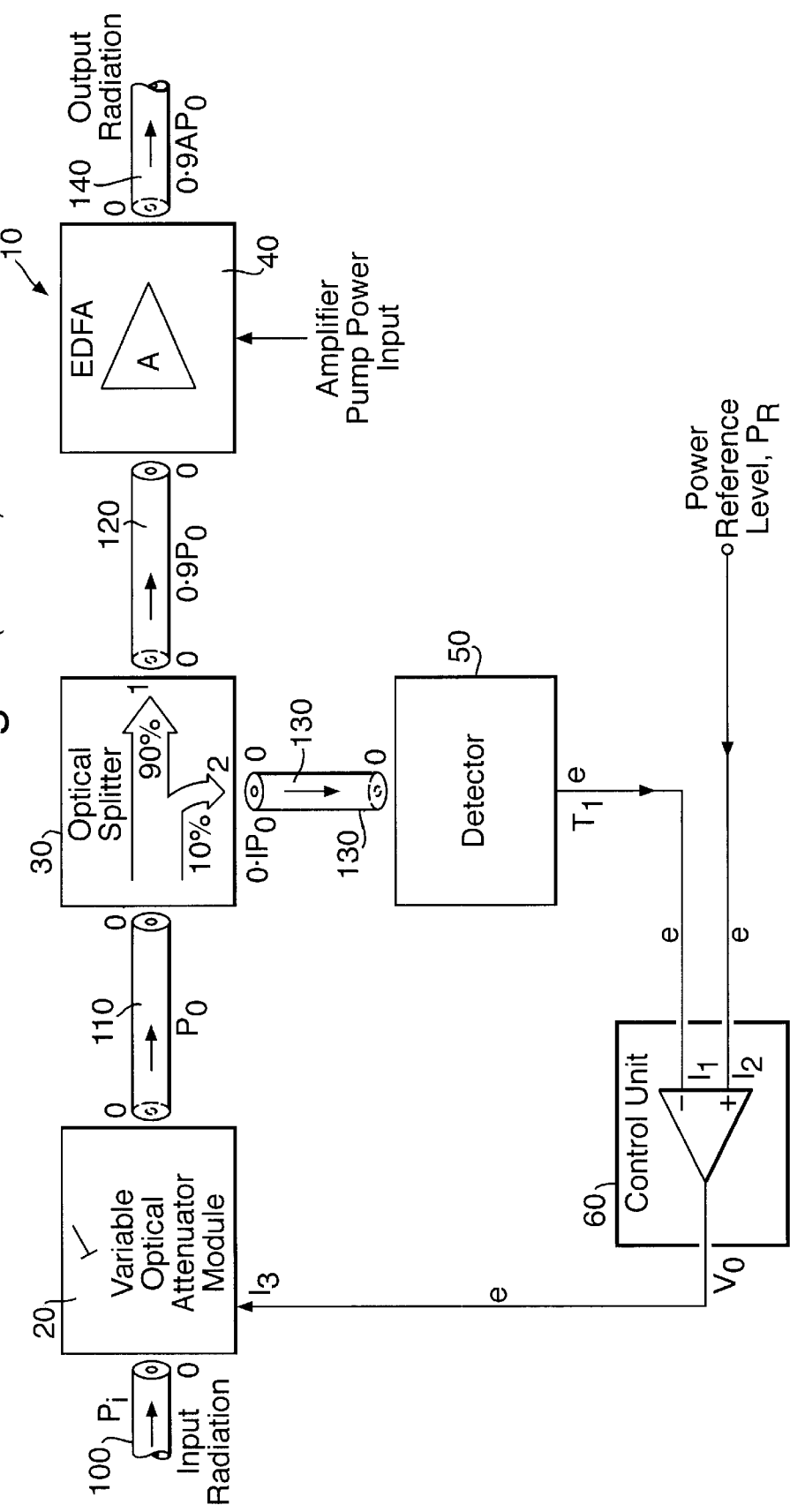
FIG. 1 is a schematic diagram of a prior art optical attenuator including an attenuator module, an EDFA and associated single loop control circuit.

Referring now to FIG. 1, there is shown a prior art optical attenuator indicated generally by 10. The attenuator 10 comprises a variable optical attenuator module 20, an optical splitter 30, an erbium-doped fibre amplifier (EDFA) 40, an optical detector 50 and a control circuit unit 60. The attenuator module 20 includes an optical input port to which a monomode optical fibre 100 is connected. The fibre 100 is operable to convey input optical radiation to the attenuator module 20. The module 20 further comprises an optical output port which is connected through a monomode optical fibre 110 to an optical input port of the splitter 30. The splitter 30 is operable to couple substantially 90% and 10% of radiation received at its input port to its first and second optical output ports respectively; in practice, a splitting ratio in a range 90%:2% to 85%:15% can be used. The first output port of the splitter 30 is connected through a monomode optical fibre 120 to an optical input port of the EDFA 40.

Moreover, the second output port of the splitter 40 is connected through a monomode optical fibre 130 to an optical input port of the detector 50. The EDFA 40 includes an optical output port wherefrom amplified radiation is emitted into a monomode optical fibre 140 for further propagation. The detector 50 includes an electrical output $T_1$ which is connected to a first input $I_1$ of the control unit 60. The unit 60 comprises a second input $I_2$ to which a power reference level signal $P_R$ is applied. Moreover, the unit 60 further includes an electrical control output $V_o$ which is connected to an electrical attenuation control input $I_3$ of the attenuator module 20.

In FIG. 1, sections where optical radiation propagates are marked with "o" and where electrical signals pass are marked with "e".

Operation of the prior art attenuator 10 will now be described with reference to FIG. 1. Input radiation having an associated radiation power $P_i$ propagates along the fibre 100 to the input port of the attenuator module 20. The module 20 attenuates the input radiation and outputs corresponding attenuated radiation having an associated radiation power $P_o$ at its output port. The attenuated radiation propagates along the fibre 110 to the optical splitter 30 which couples substantially 10% of the attenuated radiation through the fibre 130 to the detector 50 which generates a corresponding electrical signal at the electrical output $T_1$. The splitter 30 also couples substantially 90% of the attenuated radiation through the fibre 120 to the EDFA 40 which amplifies the radiation to generate output radiation having an associated power 0.9 $AP_o$ where A is an optical power amplification factor provided by the EDFA 40.

The control unit 60 compares the signal received at its input $I_1$ from the detector 50 with the reference level $P_R$ and attempts to equalize their values by setting its $V_o$ signal to an appropriate level. The $V_o$ signal controls attenuation provided by the attenuator module 20. The effect of negative feedback control exercised by the control unit 60 is to maintain the attenuated radiation at a power level $P_o$ related to the reference level $P_R$. If the reference level $P_R$ is held constant, then the attenuated radiation will be held at a constant power level suitable for the EDFA 40 to amplify.

The attenuator 10 functions satisfactorily for steady state conditions where radiation power of the input radiation is only gradually changing with time such that the control unit 60 can track and compensate for such changes. At initial power-up of the attenuator 10 in the absence of input radiation, the control unit 60 reacts to set the attenuator module 20 to its minimum attenuation. The input radiation is then gradually increased in power until a point where the attenuated radiation power begins to exceed the reference level $P_R$. At this point, the control unit 60 commences to increase attenuation provided by the attenuator module 20 to maintain the attenuated radiation at a level determined by the reference level $P_R$. Further increases in radiation power of the input radiation after this point are compensated for by the control unit 60.

A problem arises with the prior art attenuator 10 in a situation when the attenuator 10 has acquired a stable operating state and the input radiation is then suddenly interrupted. In such a situation, the control unit 60 interprets the interruption as input radiation of reduced power and proceeds to reduce attenuation provided by the attenuator module 20 in an attempt to stabilize radiation power of the attenuated radiation. Eventually, the control unit 60 adjusts the module 20 to its minimum attenuation. When the input radiation is suddenly reapplied after the interruption, the radiation propagates with low attenuation, for example 1 dB attenuation, through the attenuator module 20 and propagates onwards to the EDFA 40 causing overload and saturation therein and hence corruption of data conveyed in radiation output therefrom to the fibre 140. The control unit 60 cannot respond immediately because of its limited response bandwidth after the input radiation is reapplied after the interruption but eventually establishes the attenuated radiation to a power level corresponding to the reference level $P_R$.

In order to address the problem of saturation in the EDFA 40 after termination of the interruption, it is conventional practice to modify the control unit 60 so that it is capable of detecting when the signal $T_1$ from the detector 50 is in a low range corresponding to an absence of the input radiation. When such detection of absence occurs, the control unit 60 is operable to maintain its output signal $V_o$ at its value immediately prior to detecting the absence until a set period after the signal $T_1$ is again outside the low range, namely when reapplication of the input radiation occurs. This conventional practice has an associated problem that the attenuator module is prone to drift with regard to attenuation therethrough even though the signal $V_o$ is held constant. Such drift can arise, for example, from changes in environmental factors affecting the attenuator 10.

Figure 2:
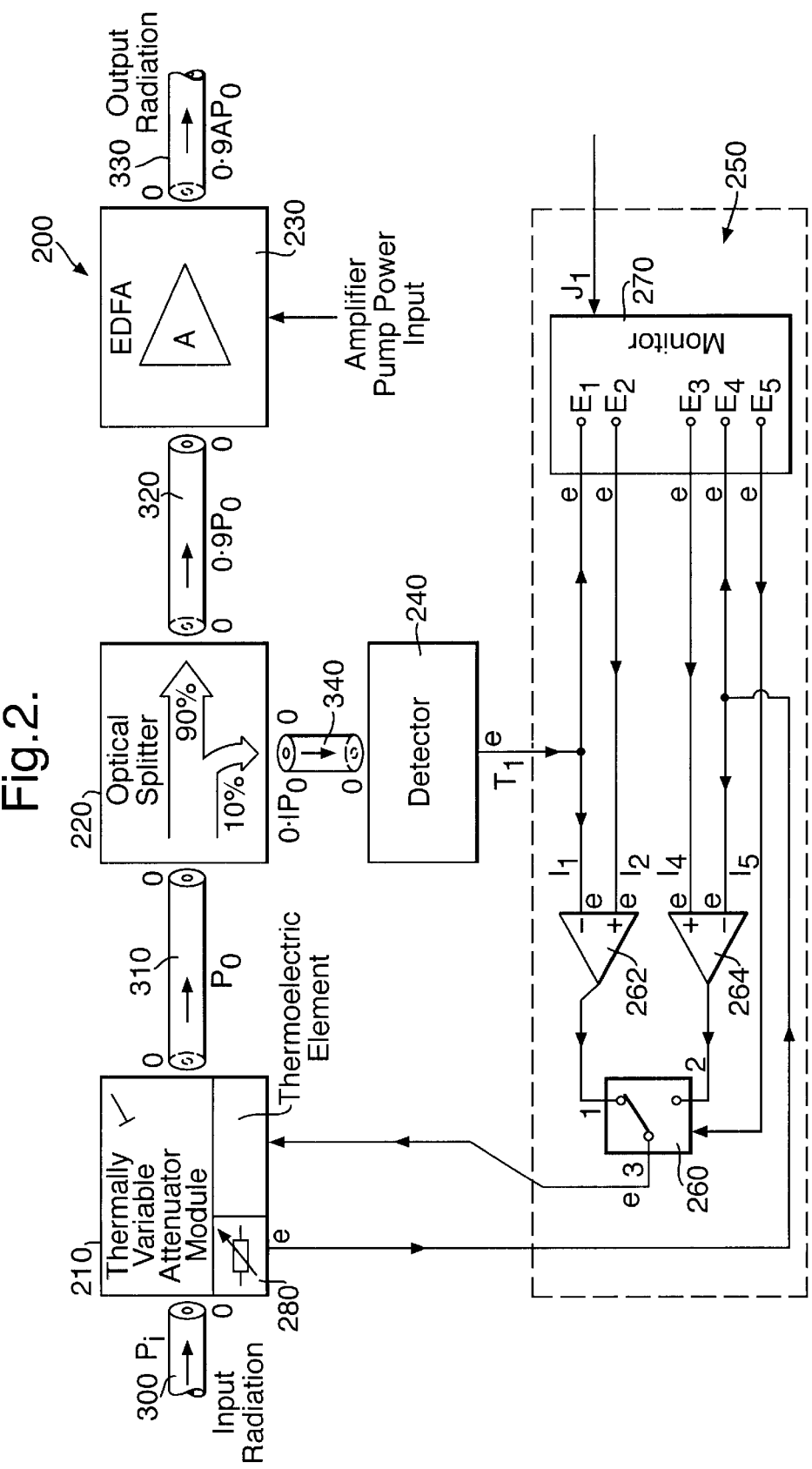
FIG. 2 is a schematic diagram of an optical attenuator according to the first aspect of the invention.

The inventors have addressed operational problems associated with the attenuator 10 by devising an attenuator as illustrated in FIG. 2. In FIG. 2, there is shown a schematic diagram of an optical attenuator according to the first aspect of the invention; the attenuator is indicated generally by 200.

The attenuator 200 comprises a thermally variable optical attenuator module 210, an optical splitter 220 similar in design to the optical splitter 30, an EDFA 230 similar in design to the EDFA 40, a detector 240 similar in design to the detector 50, and a control unit indicated by 250. The control unit 250 is implemented using microprocessor circuits with associated analogue to digital converters (ADCs) for converting analogue electrical input signals into digital data and MOSFET power transistors for applying pulse width modulated (PWM) current drive to the attenuator module 210. Although the control unit 250 operates under software control, it provides control functionalities which can be represented by equivalent electrical circuits as illustrated in FIG. 2, namely a selection switch function 260, first and second control amplifier functions 262, 264 respectively and a monitor function 270. The first and second amplifier functions 262, 264 provide first and second negative feedback loops respectively.

The attenuator module 210 differs from the aforementioned attenuator module 20 in that the attenuator 210 includes a thermoelectric element operable to cool or heat attenuation-determining optical components incorporated into the module 210, and a thermistor sensor 280 mounted in thermal contact with the thermoelectric element. The module 210 exhibits a characteristic that optical attenuation provided from its optical input port to its optical output port is determined by the temperature of the optical components, the temperature of these components being measurable using the thermistor sensor 280.

Interconnection of parts comprising the attenuator 200 will now be described with reference to FIG. 2. A monomode optical fibre 300 for conveying input radiation to the attenuator 200 is connected to an optical input port of the attenuator module 210. An optical output port of the module 210 is connected through a monomode optical fibre 310 to an optical input port of the splitter 220. A first optical output port of the splitter 220 is connected through a monomode optical fibre 320 to an optical input port of the EDFA 230. A monomode optical fibre 330 is connected to an optical output port of the EDFA 230 at which optically amplified radiation is output from the attenuator 200. The splitter 220 includes a second optical output which is connected through a monomode optical fibre 340 to an optical input port of the detector 240. In FIG. 2, routes for optical radiation and electrical signals are designated by symbols "o" and "e" respectively.

An electrical output $T_1$ from the detector 240 is connected to an ADC (not shown) of the control unit 250 and a corresponding digital output of the ADC is connected to an inverting input $I_1$ of the amplifier function 262 and to an input $E_1$ of the monitor function 270. An output $E_2$ of the monitor function 270 is connected to a non-inverting input $I_2$ of the amplifier function 262. Moreover, an output $E_3$ of the monitor function 270 is connected to a non-inverting input $I_4$ of the amplifier function 264. Furthermore, an output $E_5$ of the monitor function 270 is connected to a control input of the switch function 260 to select between an output of the amplifier function 262 when the output $E_5$ is in a first state and an output of the amplifier function 264 when the output $E_5$ is in a second state. An output of the switch function 260, said output being selectively connectable to the amplifier functions 262, 264 depending on the state of the output $E_5$, is connected through MOSFET power transistors (not shown) to an electrical input $I_3$ of the attenuator module 210. The thermistor sensor 280 is configured as part of a potential divider circuit operable to provide an electrical potential indicative of the thermoelectric element temperature. An output from the potential divider associated with the thermistor sensor 280 is connected to ADCs (not shown) of the control unit 250; the ADCs are operable to generate corresponding digital output which is connected to an input $E_4$ of the monitor function 270 and an inverting input $I_5$ of the amplifier function 264. The monitor function 270 also includes an input $J_1$ which is connected to a communication system (not shown) in which the attenuator 200 is incorporated as a component part. It is to be noted that, in reality, connection between the functions 260, 262, 264, 270 corresponds to paths of data transfer in software executed in the control unit 250.

Operation of the attenuator 200 will now be described with reference to FIG. 2. At initial energization of the attenuator 200, the switch function 260 is set to select the output of the first amplifier function 262. Moreover, the attenuator module 210 is set to provide a high optical attenuation in the order of 30 dB between its optical input and output. It can alternatively be set to a lower attenuation in the order of 1 dB if it is known in advance that the input radiation is of a relatively low power. Optical input radiation is then applied to the attenuator 200 through the fibre 300 and is at a sufficiently low initial level when transmitted through the attenuator module 210 so as to be incapable of overloading the EDFA 230. The input radiation propagates through the attenuator module 210 and via the fibre 310 to the splitter 220. The splitter 220 is operable to couple a ratio of substantially 90% of the radiation received thereat to its first output port and therefrom to the fibre 320 and to couple substantially 10% of the radiation received thereat to its second output port and therefrom to the fibre 340; the ratio can be in a range of 98%:2% to 85%:15% in practice depending upon proprietary coupling components used. Radiation propagating along the fibre 320 is received at the EDFA 230 and is amplified therein to provide amplified output radiation which is output into the fibre 330. The detector 240 receives radiation propagating along the fibre 340 and generates a corresponding signal $T_1$ indicative of the power of the radiation received at the detector 240. The signal $T_1$ passes to its associated ADC (not shown) where it is converted into a corresponding data value $T_1$. The monitor function 270 is operable to output at its $E_2$ output a reference data value corresponding to an optimum input power level for the EDFA 230 to function. The first amplifier function 262 amplifies a difference between the data value $T_1$ and the reference value to provide an amplified difference value. The switch function 260 is set by the output $E_5$ to select this amplified difference value from the first amplifier function 262, convert it into a corresponding negative feedback PWM signal and apply this signal via the MOSFET transistors to an electrical input $I_3$ of the attenuator module 210. This PWM signal is operable to drive the thermoelectric element included within the module 210 which is operable to modify the temperature of optical components incorporated into the module 210, the temperature of said components determining optical attenuation provided through the module 210. If the input radiation received at the module 210 is known to be initially at a low level, the control unit 250 is preferably operable to set the module to its minimum attenuation because the data value $T_1$ is less than the reference level from the output $E_2$.

The input radiation to the module 210 is then gradually increased. Alternatively, attenuation provided by the attenuator module 210 can be decreased. As such increase or decrease occurs, the data value $T_1$ increases until it is of similar magnitude to the reference level from the output $E_2$. Further increase in the input radiation power causes the data value $T_1$ to fractionally exceed the $E_5$ reference level resulting in the first amplifier function 262 modifying its output to modify the module 210 temperature for increasing attenuation provided by the module 210, thereby maintaining the radiation power applied to the EDFA 230 to a nominally constant level at which the EDFA 230 functions optimally. Such operation to maintain input radiation power to the EDFA 230 at a regulated magnitude corresponds to the attenuator 200 operating in its regulating mode.

When in the regulating mode, the monitor function 270 is operable to monitor the module 210 temperature as measured by the thermistor sensor 280 and thereby record an instantaneous temperature of the module 210.

In normal operation of the attenuator 200, the input radiation supplied to the attenuator module 210 is of sufficient power so that the attenuator 200 is operable in its regulating mode.

The optical communication system (not shown), of which the attenuator 200 is a component part, then has a need to interrupt the input radiation supplied to the attenuator 200, for example for purposes of reconfiguring the system. The system can indicate to the attenuator 200 that an interruption is about to occur by toggling the input $J_1$ of the monitor function 270, or applying warning data to the input $J_1$. Alternatively, the attenuator 200 is also capable of detecting an interruption by virtue of the monitor function 270 monitoring the $T_1$ output from the detector 240 and identifying when a sudden decrease in the $T_1$ data value occurs. When an interruption is indicated to the attenuator 200 via its $J_1$ input or the attenuator 200 itself detects an interruption, the monitor function 270 responds by setting the switching function 260 to its second state so that an output from the second amplifier function 264 is used to generate the negative feedback PWM output signal for driving the thermoelectric element of the module 210. At its output $E_3$, the monitor function 270 outputs a value corresponding to a value received at its $E_4$ input just prior to the interruption; this value will be referred to as a reference temperature level. The control unit 250 after the interruption has commenced is then operable to maintain the attenuator module 210 and its associated optical components at a temperature during the interruption at a level similar to the temperature of module 210 immediately prior to the interruption. The second amplifier function 264 achieves such temperature regulation during the interruption by driving the thermoelectric element so that the output from the thermistor sensor 280 as provided to the input $I_5$ of the second amplifier function 264 is similar to the reference temperature level.

Termination of interruption can be indicated by the aforementioned communication system by toggling the input $J_1$ to the control unit 250, or applying warning data to the input $J_1$. Alternatively, the attenuator 200 can sense termination of the interruption and re-establishment of the input radiation to its former level prior to the interruption by a sudden increase in the $T_1$ data value within the control unit 250. When the monitor function 270 detects such a termination of the interruption, or termination as indicated from toggling of the $J_1$ input or data input thereto, the monitor function 270 sets its output $E_5$ to switch the switching function 260 to its first state so that the amplifier function 262 resumes control for stabilizing the radiation power applied to the EDFA 230.

The inventors have appreciated that it is particularly beneficial to employ the attenuator module 210 whose attenuation is controlled by its temperature; in contrast, other types of prior art attenuator module employ lithium niobate polarizers in conjunction with Mach-Zehnder interferometers and are essentially controlled by a control voltage applied to the polarizer rather than module temperature. The thermally controlled attenuator module 210 of the invention enables temperature to be used as a parameter for stabilization during momentary interruption of input radiation to the attenuator 200. Because the module 210 of the attenuator 200 is temperature controlled during the interruption, its attenuation tends to drift less than prior art non-thermally controlled attenuators employing a single feedback loop and operable to freeze a control voltage controlling its associated attenuator module during input radiation interruption.

The thermoelectric element in the module 210 functions according to the Seebeck effect and is capable of both cooling and heating optical components present in the module 210 responsible for providing attenuation of optical radiation propagating therethrough.

Figure 3:
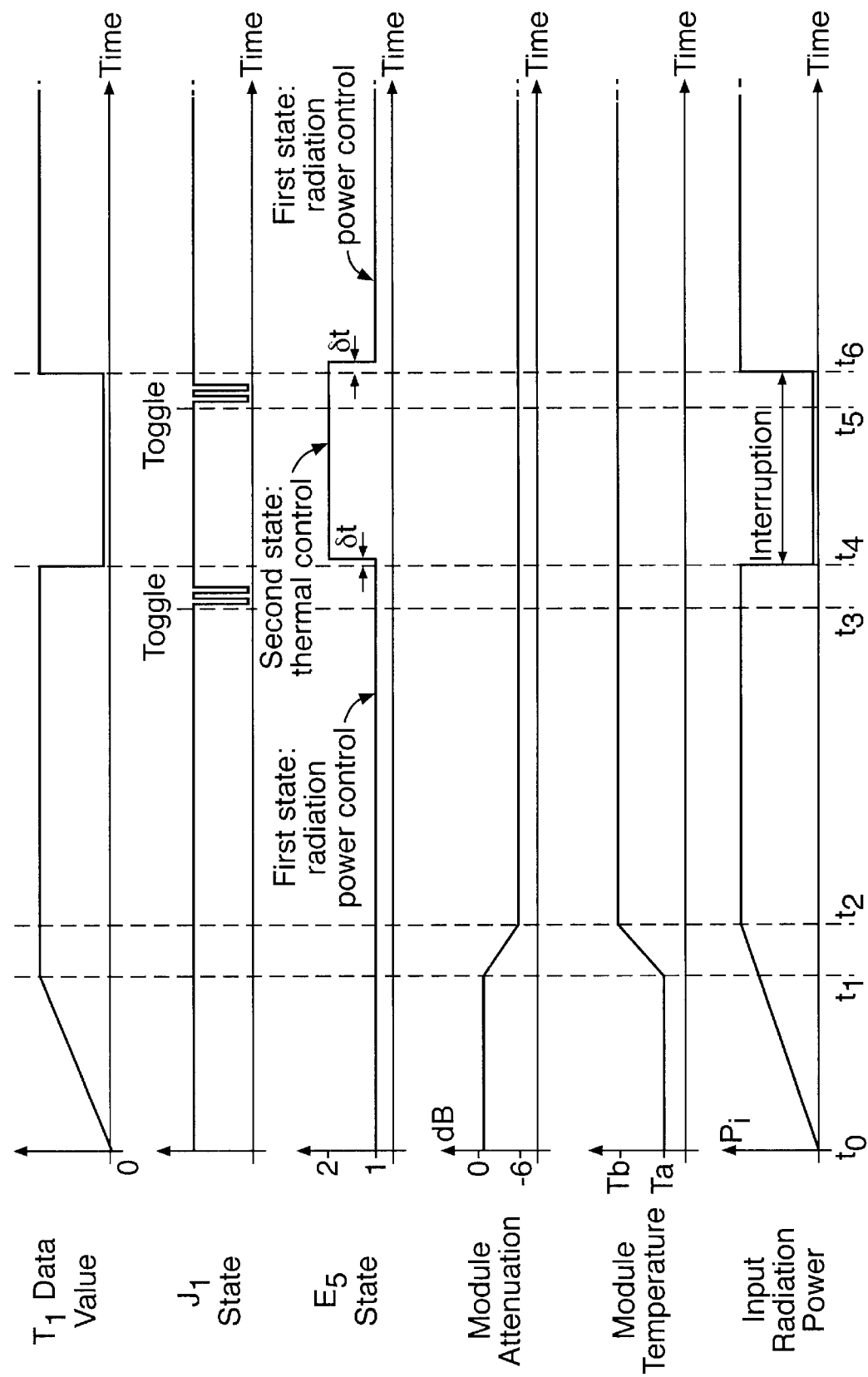
FIG. 3 is a diagram illustrating transfer of control between first and second control loops of the attenuator shown in FIG. 2.

Referring now to FIG. 3, there is shown a diagram illustrating transfer of control between first and second control loops associated with the first and second amplifier functions 262, 264 respectively of the attenuator 200. At a time $t_0$, the attenuator 200 is initially energized and the aforementioned communication system gradually increases the input radiation power after the time $t_0$. At a time $t_1$, the $T_1$ data value has attained the reference level from the $E_2$ output; the first loop commences to regulate the input power of radiation applied to the EDFA 230. The system continues increasing the input radiation power to the attenuator 200 until a time $t_2$ after which the input radiation power stabilizes. At a time $t_3$, the system toggles the $J_1$ input to indicate to the attenuator 200 that an interruption is about to occur. The attenuator 200 responds to such toggling by switching the state of $E_5$ to deselect the first loop (first state) and to select the second loop (second state); alternatively, the attenuator 200 can switch the $E_5$ state in response to a sudden drop in the $T_1$ data value at the beginning of the interruption at a time $t_4$. At the time $t_4$, the interruption commences; the state of $E_5$ selects the second loop which stabilises the temperature of the module 210 to a temperature $T_b$. At a time $t_5$ just prior to termination of the interruption, the system toggles the $J_1$ input to indicate that the input radiation to the attenuator 200 is about to be reapplied; the attenuator 200 can respond to such toggling by switching the $E_5$ state from deselecting the second loop (second state) and selecting the first loop (first state). Alternatively, the attenuator 200 can wait until the $T_1$ data value abruptly increases at a time $t_6$ indicating reapplication of input radiation to the attenuator 200 and use such an abrupt increase as a prompt for switching the $E_5$ state to select from the second loop to the first loop. After the time $t_6$, the attenuator 200 uses control through the first loop for regulating radiation power input to the EDFA 230. In the foregoing, the interruption commences at the time $t_4$ and terminates at the time $t_5$. Switchover back to the first loop is preferably performed shortly, namely a period $\delta t$, after the input radiation is reapplied at the time $t_6$ to the attenuator, otherwise the first loop may momentarily drift if activated slightly before or at the time $t_6$.

It will be appreciated that modifications can be made to the attenuator 200 without departing from the scope of the invention. Although the aforementioned control unit 250 is implemented primarily in software executing on one or more microprocessors, the unit 250 can alternatively be implemented using a mixture of analogue and digital electronic components, for example operational amplifiers, sample-and-hold circuits and analogue switches. Moreover, power control to the thermoelectric element can alternatively be of continuous analogue form rather than of a switched PWM form as described in the foregoing; however, PWM switching is more electrically power efficient and results in negligible power dissipation in the MOSFET transistors. Preferable, there are four MOSFET transistor configured in a bridge formation between two power supply rails applied to the attenuator 200.

Although the invention is described in the context of controlling temperature of the attenuator module 210 during the interruption, dual loop control provided by the control unit 250 can equally be applied to other physical parameters. For example, the module 210 can be modified to provide attenuation in response to pressure applied thereto rather than temperature; in such a modified module, the control unit 250 can be operable to control the pressure applied using its second loop during the period of interruption and can be operable in non-interruption periods to use its first loop for stabilizing radiation input power applied to the EDFA 230.

We claim:

1. An optical attenuator for a communication system, the attenuator comprising:
    a) attenuating means for receiving optical input radiation and for optically attenuating the input radiation to generate corresponding optical output radiation;
    b) controlling means for controlling attenuation provided by the attenuating means;
    c) on application of the input radiation to the attenuating means, the controlling means is operable using a first feedback loop to monitor the output radiation and to regulate its power to a predetermined level by controlling a physical attenuation determining parameter of the attenuating means; and
    d) on interruption of the input radiation to the attenuating means, the controlling means is operable using a second feedback loop to monitor the physical parameter and to regulate the parameter to a predetermined level.

2. The attenuator according to claim 1 including optical amplifying means for receiving and amplifying the output radiation from the attenuating means to generate amplified output radiation for output from the attenuator.

3. The attenuator according to claim 2 wherein the amplifying means includes an erbium-doped optical fibre amplifier.

4. The attenuator according to claim 1 wherein the controlling means is operable to regulate the physical parameter on interruption of the input radiation so that overload is avoided within the attenuator on subsequent reapplication of the input radiation.

5. The attenuator according to claim 1 wherein the predetermined level during the interruption is a value of the parameter immediately prior to the controlling means switching from controlling the attenuating means using the first loop to controlling the attenuating means using the second loop.

6. The attenuator according to claim 1 wherein the controlling means is operable to switch from the second loop to the first loop a settling period after reapplication of the input radiation after an interruption.

7. The attenuator according to claim 1 wherein the controlling means includes detecting means for detecting occurrence of an interruption of the input radiation, said interruption being determinable from abrupt changes in the radiation power of the output radiation, and for prompting the controlling means to switch to using the second feedback loop to control the attenuating means.

8. The attenuator according to claim 1 wherein the controlling means includes detecting means for detecting occurrence of interruption of the input radiation, said detecting means operable to interpret warning data supplied to the detecting means indicative of an imminent input radiation interruption.

9. The attenuator according to claim 1 wherein the physical parameter is a temperature of at least part of the attenuating means.

10. The attenuator according to claim 9 wherein the attenuating means is operable to provide optical attenuation of the input radiation to generate the output radiation dependent upon the temperature of the attenuating means.

11. The attenuator according to claim 9 wherein the attenuating means includes a thermoelectric element controllable from the controlling means for heating or cooling the attenuating means, thereby controlling optical attenuation within the attenuating means.

12. The attenuator according to claim 11 wherein the controlling means is operable to drive the thermoelectric element with a pulse width modulated (PWM) electrical drive signal for controlling power input to the thermoelectric element and thereby controlling the temperature of the attenuating means.

13. The attenuator according to claim 9 wherein the attenuating means includes a thermistor sensor for sensing the temperature of the attenuating means and for providing a measure of the temperature of the attenuating means to the controlling means for use when the second loop is activated.

14. The attenuator according to claim 1 wherein the controlling means comprises one or more microprocessors and the first and second loops are implemented in software executable on said one or more microprocessors.

15. A method of controlling an optical attenuator for a communication system, the attenuator including:

a) attenuating means for receiving optical input radiation and for optically attenuating the input radiation to generate corresponding optical output radiation; and b) controlling means for controlling attenuation provided by the attenuating means, the method comprising the steps of:

c) on application of the input radiation to the attenuating means, monitoring the output radiation and using a first feedback loop of the controlling means to regulate power of the output radiation to a predetermined level by controlling a physical attenuation determining parameter of the attenuating means; and d) on interruption of the input radiation to the attenuating means, monitoring the physical parameter and using a second feedback loop of the controlling means to regulate the parameter to a predetermined level.

* * * * *